United States Patent [19]

Inagaki

[11] Patent Number: 6,043,930
[45] Date of Patent: Mar. 28, 2000

[54] OPTICAL AMPLIFIER AND OPTICAL FIBER APPLICABLE TO OPTICAL AMPLIFIER

[75] Inventor: Shinya Inagaki, Kawasaki, Japan

[73] Assignee: Fujitsu Limited, Kawasaki, Japan

[21] Appl. No.: 08/921,015

[22] Filed: Aug. 29, 1997

[30] Foreign Application Priority Data

Mar. 17, 1997 [JP] Japan ..................................... 9-063442

[51] Int. Cl.[7] .................................. H01S 3/06; G02B 6/22
[52] U.S. Cl. .......................... 359/341; 359/134; 359/343; 385/127
[58] Field of Search ..................................... 359/134, 340, 359/341, 343, 345; 385/28, 30, 126, 127

[56] References Cited

U.S. PATENT DOCUMENTS

| | | | |
|---|---|---|---|
| 5,225,925 | 7/1993 | Grubb et al. | 359/341 |
| 5,291,501 | 3/1994 | Hanna | 372/6 |
| 5,467,218 | 11/1995 | Takeda et al. | 359/341 |
| 5,485,480 | 1/1996 | Kleinerman | 372/6 |
| 5,530,710 | 6/1996 | Grubb | 372/6 |
| 5,566,196 | 10/1996 | Sufres | 372/6 |
| 5,731,892 | 3/1998 | DiGiovanni et al. | 359/341 |
| 5,745,283 | 4/1998 | Inagaki et al. | 359/341 |
| 5,799,125 | 8/1998 | Inagaki et al. | 385/127 |

FOREIGN PATENT DOCUMENTS

| | | |
|---|---|---|
| 4-22927 | 1/1992 | Japan . |
| 5127199 | 5/1993 | Japan . |

OTHER PUBLICATIONS

S.G. Grubb, et al., "Technical Digest OFC '91", (Feb. 1991), pp. 30–34.

S. Inagaki, et al., "Optical Amplifiers and Their Applications", (Jul. 1996).

Inagaki et al, Tech. Digest, Jul. 13, 1996, Optical Amplifiers and their Applications, 4 pages.

Galent et al, Lov. J. Quant. Electron., vol. 6, #10, pp. 1190–1195, Oct. 1976.

Hanna et al, Optics Communications, vol. 63, #6, pp. 417–419, Sep. 15, 1987.

Park et al, OFC '96, Feb. 25–Mar. 1, 1996, vol. 2, pp. 280–281, Mar. 1, 1996.

*Primary Examiner*—Nelson Moskowitz
*Attorney, Agent, or Firm*—Staas & Halsey

[57] ABSTRACT

An optical amplifier having an optical waveguide structure which includes a first region in which a first dopant (for example, Er) is doped in a first glass composition (for example, Al—Si glass) and a second region in which a second dopant (for example, Er) and a third dopant (for example, Yb) are doped in a second glass composition (for example, Al—P—Si glass). The first dopant is pumped so that the optical waveguide structure may provide a first gain characteristic determined by the first glass composition and the first dopant. The third dopant is pumped so that the optical waveguide structure may provide a second gain characteristic determined by the second glass composition and the second dopant. By selectively obtaining the first and second gain characteristics, where the optical amplifier is applied to WDM (wavelength division multiplexing), the output powers of optical signals of different channels can be controlled independently of each other.

21 Claims, 8 Drawing Sheets

OPTICAL AMPLIFIER AND OPTICAL FIBER APPLICABLE TO OPTICAL AMPLIFIER

BACKGROUND OF THE INVENTION

1. Field of the Invention

This invention relates to an optical amplifier suitable for wavelength division multiplexing (WDM) and an optical fiber which can be applied to the optical amplifier.

2. Description of the Related Art

In recent years, a production technique and a use technique of an optical fiber of a low loss (for example, 0.2 dB/km) have been established, and an optical communication system wherein an optical fiber is used for a transmission line has been put into practical use. Further, in order to compensate for the loss of an optical fiber to allow long-haul transmission, use of an optical amplifier for amplifying an optical signal has been proposed and such optical amplifier has been put into practical use.

As a technique for increasing the transmission capacity of one optical fiber, wavelength division multiplexing (WDM) is available. In a system to which WDM is applied, a plurality of optical signals having different wavelengths from each other are wavelength division multiplexed by an optical multiplexer, and resulting WDM signal light is sent out into an optical fiber transmission line. On the reception side, the received WDM signal light is demultiplexed into individual optical signals by an optical demultiplexer, and transmission data are reproduced based on the optical signals.

As one of conventional optical amplifiers, an optical amplifier is known which includes an optical fiber (doped fiber) doped with a rare earth element and a pump light source for pumping the doped fiber so that the doped fiber may have a gain band which includes the wavelength of an optical signal. For example, as an optical amplifier for amplifying an optical signal of, for example, a wavelength 1.55 μm band, an EDFA (erbium-doped fiber amplifier) has been developed which includes an erbium-doped fiber (EDF) and a laser diode which outputs pump light of a wavelength 0.98 μm band or 1.48 μm band.

In order to incorporate an EDFA into a system to which WDM is applied, it is preferable that output control can be performed for optical signals of individual channels. In an ordinary EDF, since erbium as a dopant is doped uniformly in a core, a gain characteristic (wavelength dependency of the gain) is determined uniquely, and accordingly, it is impossible to effect output control of optical signals of individual channels independently of each other.

Taking the foregoing into consideration, the inventor of the present invention has published a structure and a use technique of a specific EDF for effecting output control of optical signals of individual channels in TECHNICAL DIGEST of OPTICAL AMPLIFIERS AND THEIR APPLICATIONS (OAA) (July, 1996).

The technique is described briefly with reference to FIGS. 1 and 2. Referring first to FIG. 1, reference numeral 2 denotes a cross sectional construction of the EDF in the proximity of a core. The EDF shown has a first region 4 made of Si—Ge glass and a second region 6 made of Si—Al glass. Each of the first and second regions 4 and 6 is doped with erbium (Er). The first region 4 is positioned in the proximity of the center of the core while the second region 6 is provided in such a ring-shaped configuration that it surrounds the first region.

In FIG. 1, reference numerals 8 and 10 denote distributions of the power density in a diametrical direction when pump light of a wavelength 0.98 μm band and pump light of another wavelength 1.48 μm band are propagated in an EDF, respectively. The mode field diameter of the pump light of the wavelength 0.98 μm band is comparatively small as denoted by reference numeral 12 while the mode field diameter of the pump light of the wavelength 1.48 μm band is comparatively large as denoted by reference numeral 14. Accordingly, with this EDF, erbium doped in the first region 4 can be selectively pumped by pump light of the wavelength 0.98 μm band while erbium doped in the second region 6 can be selectively pumped by pump light of the wavelength 1.48 μm band.

Referring now to FIG. 2, there are shown two gain characteristics obtained with the EDF of FIG. 1. In FIG. 2, the axis of ordinate indicates the normalized value of the emission (or emission cross section), and the axis of abscissa indicates the wavelength (nm). It is known that the wavelength characteristic of the emission corresponds to the wavelength characteristic of the gain (dB/m) of the EDF per unit length, that is, the gain characteristic. Based on the fact that the first and second regions 4 and 6 have different glass compositions, where the EDF is pumped with pump light of the wavelength 0.98 μm band, such a comparatively steep gain characteristic as denoted by reference numeral 16 is obtained, but where the EDF is pumped with pump light of the wavelength 1.48 μm band, such a comparatively moderate gain characteristic as denoted by reference numeral 18 is obtained. Accordingly, if an optical amplifier is formed from an EDF of the type described above and at least two pump light sources and is applied to a WDM system, then the output powers of optical signals of individual channels can be controlled independently of each other.

An optical amplifier which employs the EDF described above with reference to FIG. 1 may possibly suffer from two drawbacks based on the following reasons.

(1) Since the second region 6 is provided at a position where the power density of pump light of the wavelength 1.48 μm band is comparatively low, the gain of the optical amplifier may not possibly be made sufficiently high.

(2) Although the first and second regions 4 and 6 are pumped principally with pump light of the 0.98 μm band and pump light of the 1.48 μm band, respectively, since the two pump lights are different in mode field from each other, the first region 4 is pumped also with pump light of the 1.48 μm band while the second region 6 is pumped also with pump light of the 0.98 μm band. As a result, where the EDF is applied to WDM, there is the possibility that the dynamic range of each input power may not be made large.

Here, the "dynamic range of each input power" signifies an allowable range, where WDM signal light including optical signals of first and second channels are supplied to the optical amplifier, of the input power of one of the optical signals within which the requirement that the powers of the amplified optical signals of the first and second channels be equal to each other when the input power of the other of the optical signals of the first and second channels is fixed is satisfied.

SUMMARY OF THE INVENTION

Accordingly, it is an object of the present invention to provide an optical amplifier with which a high gain can be obtained and, when it is applied to WDM, the dynamic range of each input power can be increased.

It is another object of the present invention to provide an optical fiber (doped fiber) with which an optical amplifier of the type just mentioned can be provided.

In accordance with an aspect of the present invention, there is provided an optical amplifier which comprises an optical waveguide structure and first and second means which effect pumping of the optical waveguide structure. The optical waveguide structure includes a first region in which a first dopant is doped in a first glass composition and a second region in which a second dopant and a third dopant are doped in a second glass composition. The first means pumps the first dopant so that the optical waveguide structure may provide a first gain characteristic determined by the first glass composition and the first dopant. The second means pumps the third dopant so that the optical waveguide structure may provide a second gain characteristic determined by the second glass composition and the second dopant.

In the optical amplifier of the present embodiment, since the two gain characteristics (first and second gain characteristics) different from each other are selectively obtained by combinations of the glass compositions and the pumping operations of the dopants, any disadvantage which may otherwise arise from an alternative case wherein gain characteristics are selectively obtained depending upon a difference in mode field diameter as in the prior art does not arise. In other words, according to the present invention, an optical amplifier with which a high gain can be obtained and, when applied to WDM, large dynamic ranges can be assured for individual input powers.

In accordance with another aspect of the present invention, there is provided an optical fiber for use with an optical amplifier. The optical fiber comprises a first region doped with a first dopant, and a second region doped with a second dopant and a third dopant. The first region has a first glass composition for cooperating with the first dopant to provide a first gain characteristic. The second region has a second glass composition for cooperating with the second dopant to provide a second gain characteristic different from the first gain characteristic. The third dopant is selected so that, when the third dopant is pumped, the second dopant is pumped by the third dopant pumped.

By using the optical fiber described above, an optical amplifier with which a high gain can be obtained and, when applied to WDM, large dynamic ranges can be assured for individual input powers in accordance with the principle described above can be provided.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

In the following, preferred embodiments of the present invention are described in detail.

In the present specification, the term "doped fiber" is used to signify an optical fiber doped with a dopant for providing a gain to an optical signal. The dopant preferably includes a rare earth element. Here, "the dopant includes a rare earth element" signifies that the dopant is a rare earth element or ions or a compound of a rare earth element.

In the present specification, the term "doped fiber" should be interpreted in a wide sense. In particular, taking the fact into consideration that generally an optical fiber and a preform which is an intermediate medium in a production process of an optical fiber have similar sectional structures, the "doped fiber" should be interpreted as including such preform.

Figure 1:
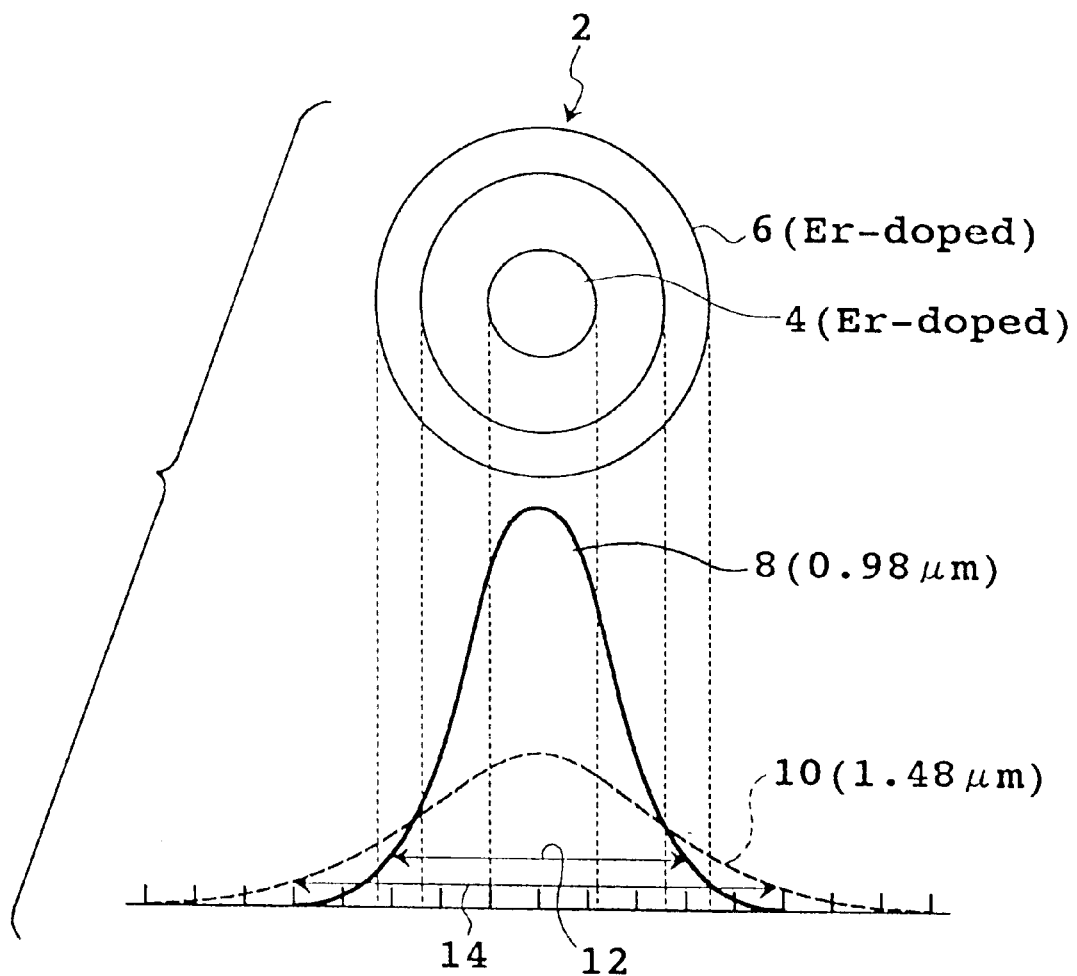
FIG. 1 is a diagrammatic view illustrating a cross sectional construction of a conventional doped fiber and a mode field of pump light.
Figure 2:
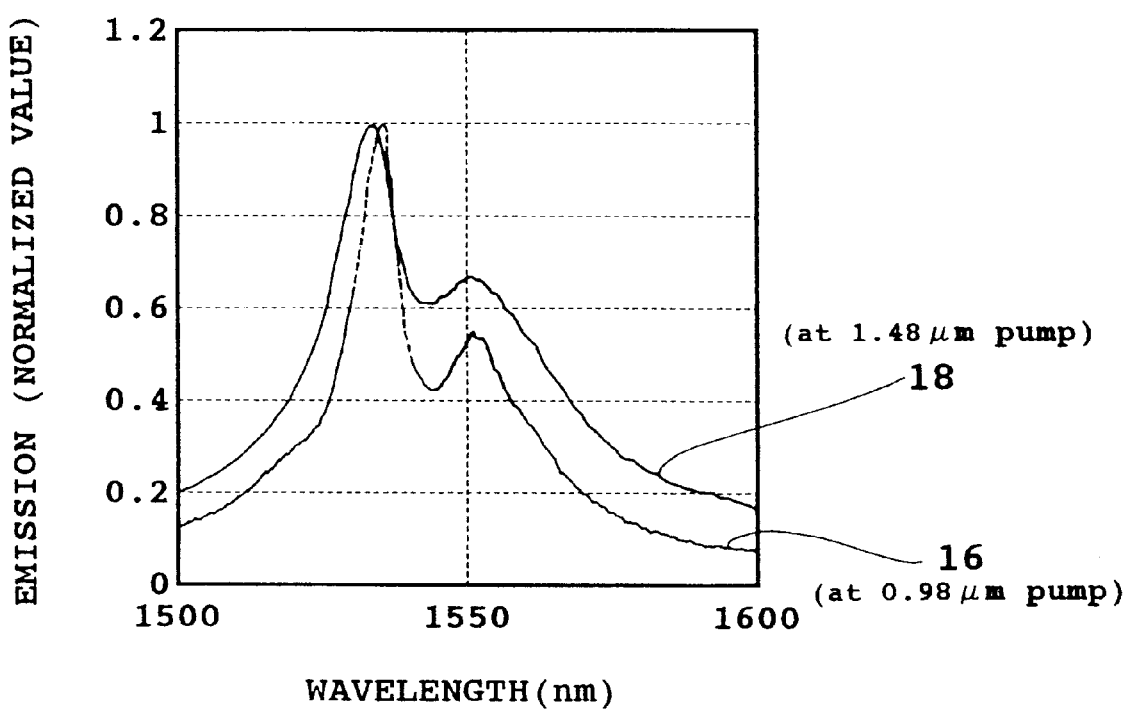
FIG. 2 is a diagram illustrating two gain characteristics obtained by the prior art of FIG. 1.
Figure 3:
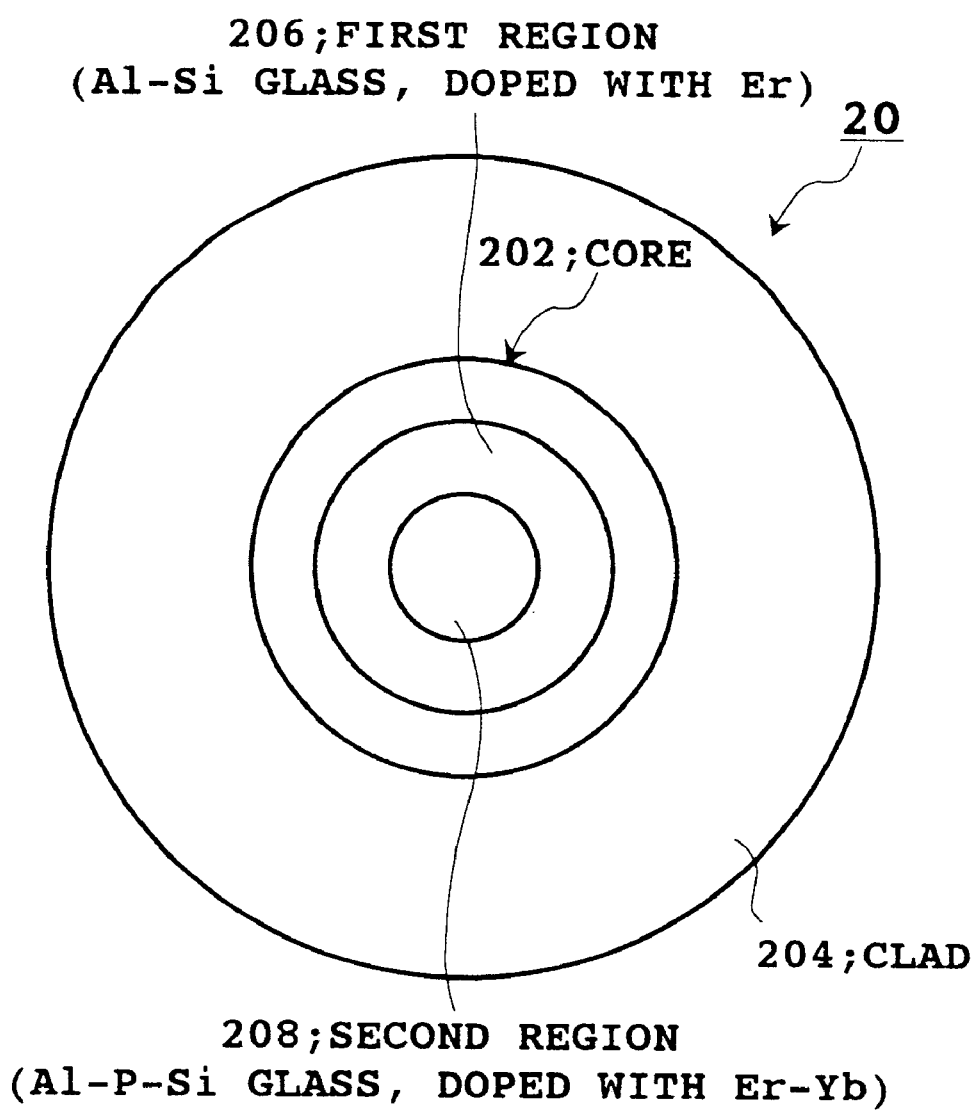
FIG. 3 is a sectional view showing an embodiment of a doped fiber according to the present invention.

FIG. 3 is a cross sectional view showing an embodiment of a doped fiber according to the present invention. Referring to FIG. 3, the doped fiber 20 includes a core 202 which has a comparatively high refractive index, and a clad or cladding 204 which surrounds the core 202 and has a comparatively low refractive index. An optical waveguide structure is provided by the core 202 and the cladding 204. The doped fiber 20 has a first region 206 in which a first dopant is doped in a first glass composition and a second region 208 in which a second dopant and a third dopant are doped in a second glass composition. From the point of view of a production technique, one of the regions 206 and 208 surrounds the other. In the example shown in FIG. 3, the second region 208 is surrounded by the first region 206, and the regions 206 and 208 are included in the core 202.

In the following, in order to facilitate detailed recognition of the present invention, it is assumed that, in the first region 206, the first dopant includes Er (erbium) and the first glass composition is Al—Si glass, and in the second region 208, the second and third dopants include Er and Yb (ytterbium), respectively, and the second glass composition is Al—P—Si glass. Here, the Al—Si glass is glass which includes an oxide of Al (aluminum) and an oxide of Si (silicon), and the Al—P—Si glass is glass which includes an oxide of Al, an oxide of P (phosphor) and an oxide of Si.

Figure 4:
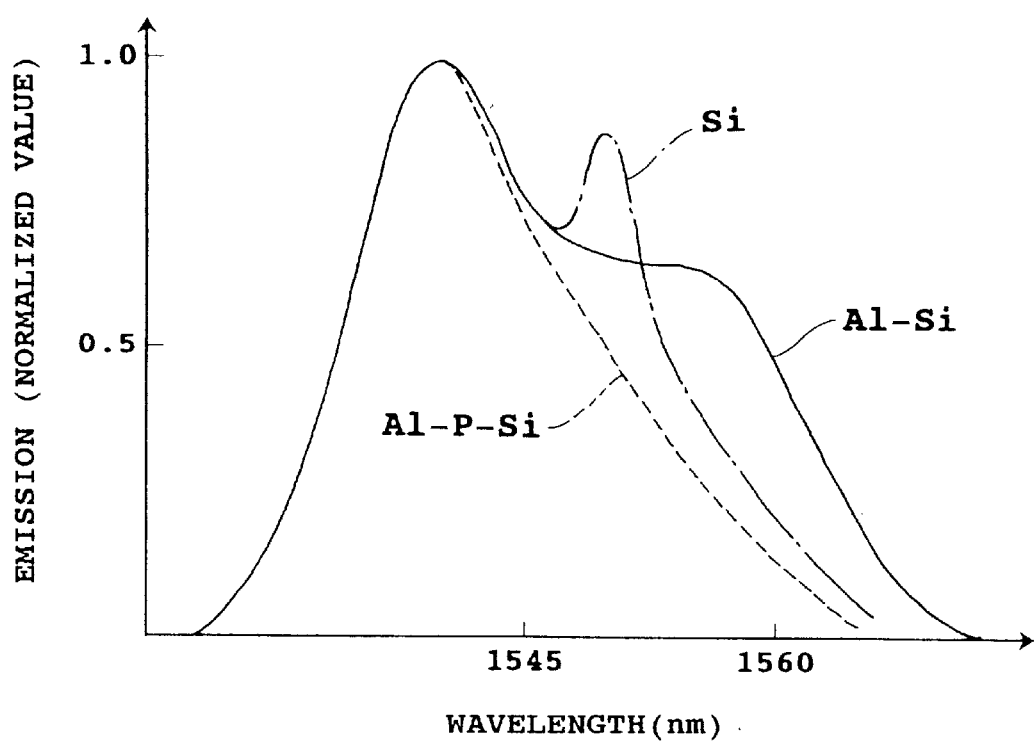
FIG. 4 is a diagram illustrating a difference in gain characteristic depending upon the glass composition.

Referring to FIG. 4, there is illustrated a difference in gain characteristic which depends upon the glass composition of a doped fiber whose dopant includes Er. In FIG. 4, the axis of ordinate indicates the normalized value of the emission or emission cross-sectional area, and the axis of abscissa indicates the wavelength (nm). With Si glass (glass which includes a silicon oxide as a principal component), as indicated by an alternate long and short dash line, a gain characteristic which has a steep peak in the proximity of the wavelength of 1,550 nm is obtained. In this gain characteristic, since the gain varies by a large extent in accordance with the wavelength, this gain characteristic is not suitable for WDM of the wavelength 1.55 μm band. With the Al—Si glass, as indicated by a solid line, a comparatively gentle gain characteristic having no steep peak is obtained. This gain characteristic is determined by the Al—Si glass (first glass composition) and Er (the first dopant) and will be hereinafter referred to as "first gain characteristic". With the Al—P—Si glass, as indicated by a broken line, such a gain characteristic that the gain decreases monotonously in a wavelength region longer than the wavelength 1,540 nm is obtained. This gain characteristic is determined by the Al—P—Si glass (second glass composition) and Er (second dopant) and will be hereinafter referred to as "second gain characteristic".

The first and second gain characteristics are different from each other. Accordingly, if the first and second gain characteristics are obtained selectively or the ratio between the first and second gain characteristics in composition of them can be varied, then when to effect WDM, the output powers of optical signals of individual channels can be controlled independently of each other.

Therefore, in the present embodiment, in the cross-sectional structure of FIG. 3, Er doped in the second region 208 is selectively pumped using pump light of a particular wavelength. If only Er doped in the second region 208 is pumped, the second gain characteristic is obtained, but if Er doped in both of the first and second regions 206 and 208 is pumped, a composite characteristic of the first and second characteristics is obtained.

Figure 5:
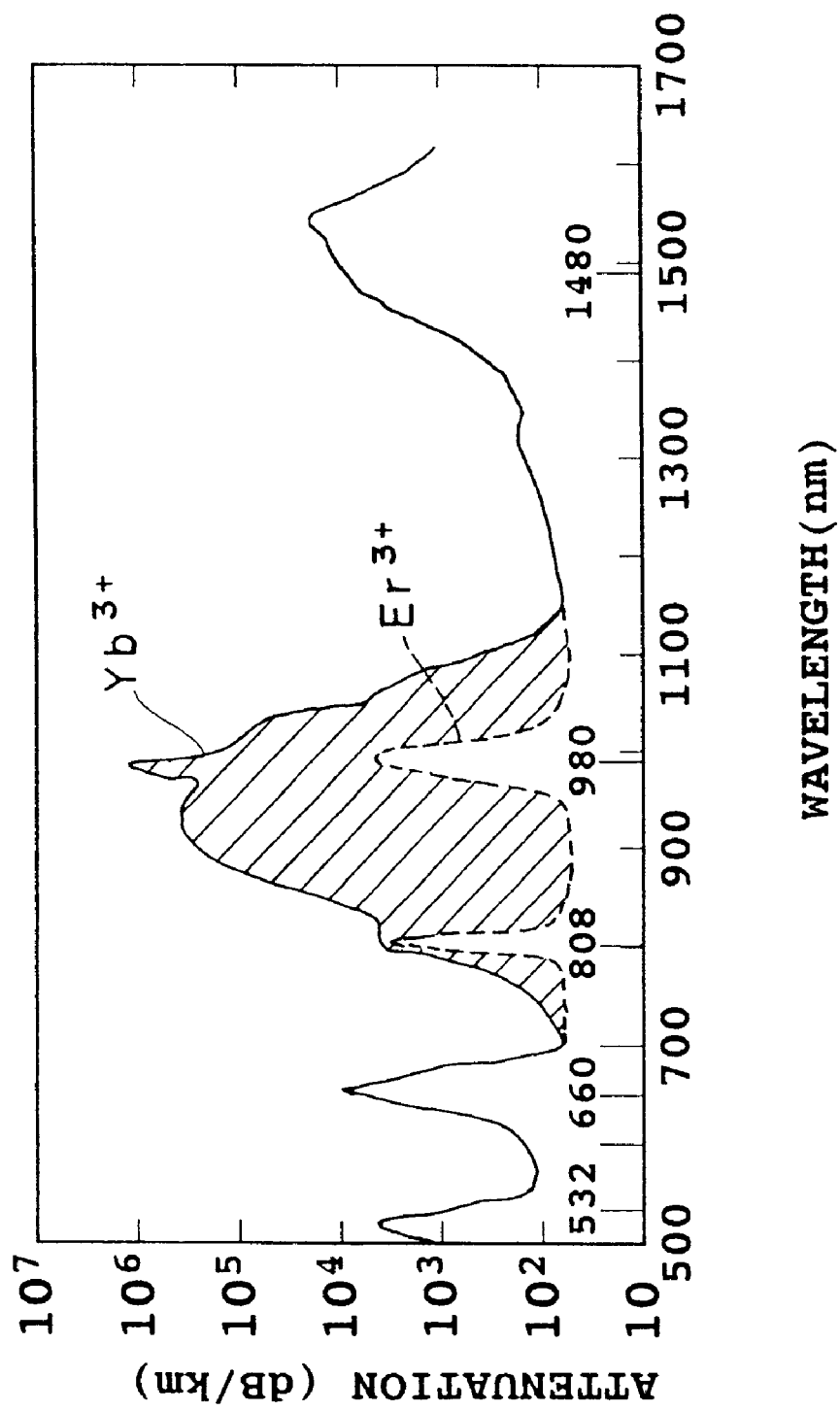
FIG. 5 is a diagram illustrating absorption characteristics of Er and Yb.

Referring to FIG. 5, there are illustrated absorption characteristics of Er ($Er^{3+}$) and Yb ($Yb^{3+}$). In FIG. 5, the axis of ordinate indicates the attenuation (dB/km) and the axis of abscissa indicates the wavelength (nm). For example, within a range from 0.7 to 1.6 $\mu$m, Er has three absorption bands, and Yb has one absorption band which includes two of the three absorption bands of Er.

Figure 6:
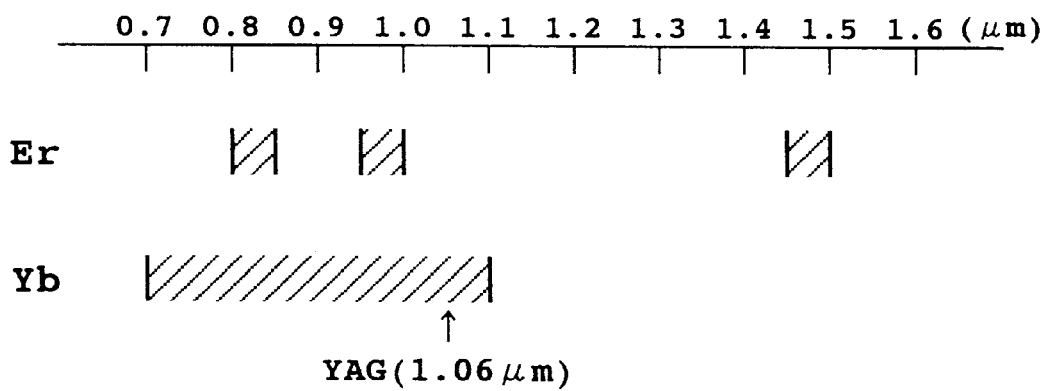
FIG. 6 is a diagrammatic view illustrating absorption bands of Er and Yb.

More accurately, as seen from FIG. 6, the absorption bands of Er are provided by a band of 800 to 840 nm, another band of 960 to 1,000 nm and a further band of 1,455 to 1,495 nm, and the absorption band of Yb is provided by a band of 700 to 1,100 nm.

Er can be pumped using first pump light which has a wavelength included in the absorption bands of Er. Meanwhile, Yb can be pumped using second pump light which has a wavelength included in the absorption band of Yb.

Accordingly, in the doped fiber of FIG. 3, Er doped in the regions 206 and 208 can be pumped with the first pump light, and Yb doped in the region 208 can be pumped with the second pump light. When Yb in the region 208 is pumped, Er in the region 208 is pumped by energy transfer from Yb. Accordingly, particularly where the wavelength of the second pump light is not included in the absorption bands of Er, only Er doped in the region 208 can be selectively pumped with the second pump light.

Figure 7:
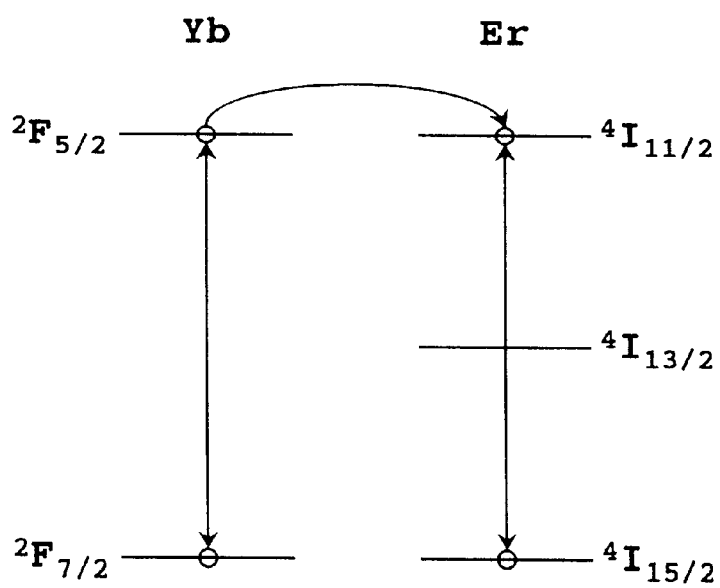
FIG. 7 is a diagrammatic view illustrating energy transfer from Yb to Er.

Energy transfer from Yb to Er is described with reference to FIG. 7. With the second pump light, Yb is pumped from an energy level $^2F_{7/2}$, which corresponds to the ground state, to another energy level $^2F_{5/2}$. By this energy transfer from pumped Yb to Er, Er is pumped from an energy level $^4I_{15/2}$, which corresponds to the ground state, to another energy level $^4I_{11/2}$ via a further energy level $^4I_{13/2}$.

It is to be noted that, for the energy transfer from Yb to Er, refer also to PD7, Technical Digest (Post Dead Line Papers), OFC' 91, pp.31–34.

Figure 8:
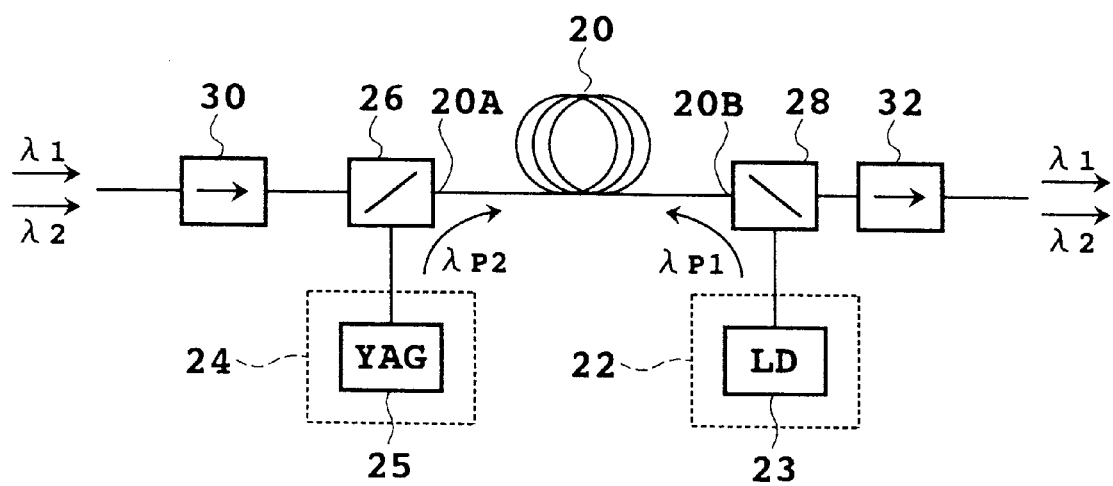
FIG. 8 is a block diagram showing an embodiment of an optical amplifier of the present invention.

Referring now to FIG. 8, there is shown an embodiment of an optical amplifier according to the present invention. The optical amplifier includes the doped fiber 20 shown in FIG. 3, a light source unit 22 for outputting first pump light for providing the first gain characteristic indicated by the solid line in FIG. 4, another light source unit 24 for outputting second pump light for providing the second gain characteristic indicated by the broken line in FIG. 4. The wavelength $\lambda_{P1}$ of the first pump light is set so as to be included in the absorption bands of Er while the wavelength $\lambda_{P2}$ of the second pump light is set so as to be included in the absorption band of Yb but not to be included in the absorption bands of Er.

In the present embodiment, the light source unit 22 includes a laser diode (LD) 23 and the wavelength $\lambda_{P1}$ is set approximately to 1.48 $\mu$m, and the light source unit 24 includes a YAG laser 25 and the wavelength $\lambda_{P2}$ is set approximately to 1.06 $\mu$m.

A first end 20A of the doped fiber 20 and the light source unit 24 are connected to a WDM coupler 26 so that the second pump light outputted from the YAG laser 25 is supplied from the first end 20A to the doped fiber 20 through the WDM coupler 26. A second end 20B of the doped fiber 20 and the light source unit 22 are connected to another WDM coupler 28 so that the first pump light outputted from the laser diode 23 is supplied from the second end 20B to the doped fiber 20 through the WDM coupler 28. An input side optical isolator 30 is connected to the WDM coupler 26 while an output side optical isolator 32 is connected to the WDM coupler 28.

WDM signal light obtained by wavelength division multiplexing of an optical signal of a wavelength $\lambda_1$ and another optical signal of another wavelength $\lambda_2$ is supplied to the doped fiber 20 through the optical isolator 30 and the WDM coupler 26. When the WDM signal light is supplied to the doped fiber 20 which is pumped with the first and second pump lights, the WDM signal light is amplified in the doped fiber 20, and the amplified WDM signal light successively passes through the WDM coupler 28 and the optical isolator 32 and is outputted from the optical amplifier.

While the number of channels of WDM signal light to be amplified is 2 in FIG. 8, the channel number may otherwise be larger than 2. In the following, operation of the optical amplifier is described under the assumption that the wavelengths $\lambda_1$ and $\lambda_2$ are 1,535 nm and 1,558 nm, respectively.

Now, if it is assumed that the doped fiber 20 is pumped only with the second pump light from the YAG laser 25, then since only Er doped in the second region 208 (refer to FIG. 3) is selectively pumped, such a second gain characteristic as indicated by a broken line in FIG. 4 is obtained. On the other hand, when the doped fiber 20 is pumped only with the first pump light from the laser diode 23, since Er doped in the regions 206 and 208 (refer to FIG. 3) is pumped, a gain characteristic (intermediate gain characteristic) between the first gain characteristic indicated by a solid line in FIG. 4 and the second gain characteristic indicted by a broken line is obtained.

As apparently seen from FIG. 4, the gain provided to the optical signal of the wavelength $\lambda_1$ (1,535 nm) by the second gain characteristic and the gain provided to the optical signal of the wavelength $\lambda_1$ by the intermediate gain characteristic are substantially equal to each other. On the other hand, with the optical signal of the wavelength $\lambda_2$ (1,558 nm), the gain provided by the intermediate gain characteristic is higher than the gain provided by the second gain characteristic.

Accordingly, while the gain to the optical signal of the wavelength $\lambda_1$ varies substantially in similar manners to each other in accordance with the variations of the powers of the first and second pump lights, the gain to the optical signal of the wavelength $\lambda_2$ varies not only in accordance with the variations of the powers of the first and second pump lights but also in accordance with the variation of the power ratio between the first and second pump lights.

Therefore, by suitably controlling the power ratio between the powers of the first and second pump lights and the powers, the output powers of the optical amplifier regarding the individual optical signals can be controlled independently of each other.

In the present embodiment, the wavelength $\lambda_{P2}$ of the second pump light is set approximately to 1.06 82 m using the YAG laser 25. As apparently seen from FIG. 6, while the wavelength 1.06 $\mu$m is included in the absorption band of Yb, it is not included in any one of the absorption bands of Er. Accordingly, only Er doped in the second region 208 (refer to FIG. 3) can be selectively pumped with the second pump light. As a result, comparing with an alternative case wherein selective pumping is performed depending upon the difference in mode field diameter as in the prior art, wider dynamic ranges can be provided for the input powers for WDM.

Further, since the first and second regions 206 and 208 doped with Er for providing a gain to an optical signal of the wavelength 1.55 $\mu$m band (1.50 $\mu$m to 1.60 $\mu$m) are included in the core 202 in which the power density is sufficiently high in the optical waveguide structure as seen in FIG. 3, the gain of the optical amplifier can be increased. The diameter of the core 202 is set, for example, approximately to 2 $\mu$m so as to provide a single mode at the wavelength 1.06 $\mu$m.

While, in the embodiment of FIG. 8, the first and second pump lights are supplied to the second end 20B and the first end 20A of the doped fiber 20, respectively, the light source units 22 and 24 may be exchanged for each other so that the first and second pump lights may be supplied to the doped fiber 20 from the first end 20A and the second end 20B, respectively.

Further, while, in the embodiment of FIG. 8, the second pump light propagates in the same direction as the optical signals and the first pump light propagates in the opposite direction to the optical signals in the doped fiber 20 to effect bidirectional pumping, forward pumping or backward pumping may be adopted alternatively. In forward pumping, the first and second pump lights propagate in the same direction as the optical signals in the doped fiber 20, but in backward pumping, the first and second pump lights propagate in the opposite direction to the optical signals in the doped fiber 20.

The reason why, in the embodiment of FIG. 3, the second region 208 is surrounded by the first region 206 is that the wavelength $\lambda_{P1}$ of the first pump light for pumping Er doped in the first region 206 is longer than the wavelength $\lambda_{P2}$ of the second pump light for pumping Yb doped in the second region 208 and accordingly the mode field diameter of the first pump light is larger than the mode field diameter of the second pump light.

Though not shown in the drawings, the first region 206 and the second region 208 shown in FIG. 3 may alternatively be exchanged for each other such that the first region may be surrounded by the second region. In this instance, in order to provide an optical amplifier having a high gain, the wavelength of the first pump light is preferably set shorter than the wavelength of the second pump light. For example, where light from a YAG laser is used as the second pump light, a laser diode which oscillates in the wavelength 0.98 $\mu$m band may be used as the light source for the first pump light.

While, in the embodiment of FIG. 3, the glass composition of the first region 206 is Al—Si glass and the glass composition of the second region 208 is Al—P—Si glass, the glass compositions may alternatively be exchanged for each other.

Figure 9:
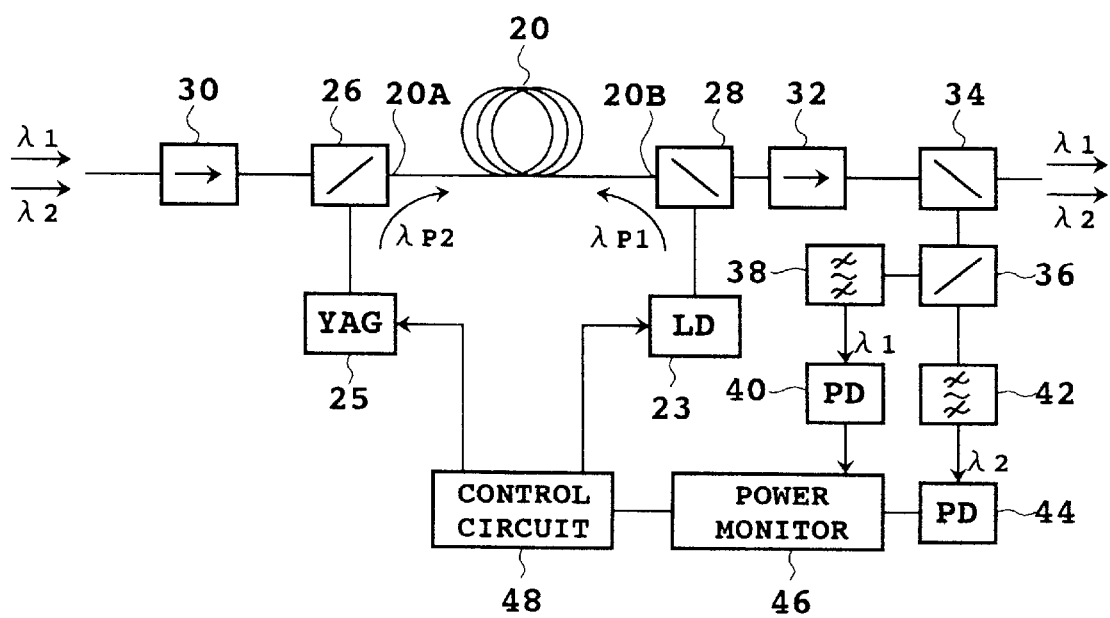
FIG. 9 is a block diagram showing another embodiment of an optical amplifier of the present invention.

Referring now to FIG. 9, there is shown another embodiment of an optical amplifier according to the present invention. The present optical amplifier is characterized, in contrast with the optical amplifier of FIG. 8, in that it additionally includes a mechanism for controlling the ratio between the powers of the first and second pump lights so that the powers of the amplified optical signals of the wavelengths $\lambda_1$ and $\lambda_1$ may be substantially equal to each other. Details are described below.

Part of WDM signal passing through and amplified by the output side optical isolator 32 is extracted by an optical coupler 34. The extracted light is branched into first and second branch lights by another optical coupler 36. The first branch light first passes through an optical band-pass filter 38 and is then converted into an electric signal by a photo-detector (PD) 40 while the second branch light first passes through another optical band-pass filter 42 and is then converted into an electric signal by another photo-detector 44. The filter 38 has a pass band which includes the wavelength $\lambda_1$ while the filter 42 has another pass band which includes the wavelength $\lambda_2$. The output electric signals of the photo-detectors 40 and 44 are supplied to a power monitor 46. The levels of the output electric signals of the photo-detectors 40 and 44 correspond to the powers of the optical signals of the wavelengths $\lambda_1$ and $\lambda_2$ amplified by the present optical amplifier, respectively. A control circuit 48 controls driving current for the laser diode 23 and driving current for the YAG laser 25 in response to an output signal of the power monitor 46.

More particularly, the ratio between the power of the first pump light outputted from the laser diode 23 and the power of the second pump light outputted from the YAG laser 25 is controlled by the control circuit 48. Consequently, the composition ratio between the first gain characteristic indicated by the solid line in FIG. 4 and the second gain characteristic indicated by the broken line is varied so that the power of the optical signal of the wavelength $\lambda_1$ and the power of the optical signal of the wavelength $\lambda_2$ both amplified by the present optical amplifier become substantially equal to each other.

While, in the embodiments described above, the present invention is applied to a doped fiber for which a silica optical fiber is used, the optical amplifier of the present invention is not limited by such doped fiber. For example, the present invention can be worked using a doped fiber which includes a halide such as, example, a fluoride as a principal component. Further, the optical amplifier may be formed otherwise using an optical waveguide structure (for example, dielectric optical waveguide) for which a doped fiber is not used.

As described above, according to the present invention, an advantage is provided that an optical amplifier with which a high gain can be obtained and, where it is applied to WDM, large dynamic ranges can be assured for individual input powers can be provided. Further, according to the present invention, also another advantage is provided that an optical fiber which has a novel construction which can be applied to an optical amplifier of the type just mentioned can be provided.

The present invention is not limited to the details of the above described preferred embodiments. The scope of the invention is defined by the appended claims and all changes and modifications as fall within the equivalence of the scope of the claims are therefore to be embraced by the present invention.

What is claimed is:

1. An optical amplifier, comprising:
   an optical waveguide structure including a first region in which a first dopant is doped in a first glass composition and a second region in which a second dopant and a third dopant are doped in a second glass composition;
   first means for pumping said first dopant so that said optical waveguide structure provides a first gain characteristic determined by said first glass composition and said first dopant; and
   second means for pumping said third dopant so that said optical waveguide structure provides a second gain characteristic determined by said second glass composition and said second dopant, said second gain characteristic being different from said first gain characteristic;
   one of said first and second regions being surrounded by the other;
   said second dopant being pumped by energy transfer from said third dopant pumped with said second means.

2. An optical amplifier according to claim 1, wherein said first and second dopants are a same dopant.

3. An optical amplifier according to claim 1, wherein each of said first, second and third dopants includes a rare earth element.

4. An optical amplifier according to claim 1, wherein said optical waveguide structure includes a core having a comparatively high refractive index and a cladding having a comparatively low refractive index, and said first and second regions are included in said core.

5. An optical amplifier according to claim 1, wherein said second region is surrounded by said first region.

6. An optical amplifier according to claim 1, wherein each of said first and second dopants includes Er (erbium) while said third dopant includes Yb (ytterbium).

7. An optical amplifier according to claim 6, wherein said first means includes a first light source for generating first pump light of a first wavelength included in a first wavelength band which is absorbed by Er, and said second means includes a second light source for generating second pump light of a second wavelength which is included in a second wavelength band which is absorbed by Yb but is not included in the first wavelength band.

8. An optical amplifier according to claim 7, wherein the first wavelength band is provided by a band of 800 to 840 nm, another band of 960 to 1,000 nm and a further band of 1,455 to 1,495 nm, and the second wavelength band is provided by a band of 700 to 1,100 nm.

9. An optical amplifier according to claim 7, wherein said first light source includes a laser diode and the first wavelength is approximately 1.48 μm, and said second light source includes a YAG laser and the second wavelength is approximately 1.06 μm.

10. An optical amplifier according to claim 7, wherein said optical waveguide structure is embodied as an optical fiber having a first end and a second end, one of the first and second pump lights being supplied to the first end of said optical fiber, and the other of the first and second pump lights being supplied to the second end of the optical fiber.

11. An optical amplifier according to claim 7, wherein one of said first and second glass compositions includes Al (aluminum), P (phosphor) and Si (silicon) while the other includes Al and Si.

12. An optical amplifier according to claim 7, further comprising means for controlling a ratio between powers of the first and second pump lights so that, when at least two optical signals having different wavelengths from each other are supplied to said optical amplifier, powers of the two optical signals amplified by said optical amplifier may be substantially equal to each other.

13. An optical fiber for use with an optical amplifier, comprising:
    a first region doped with a first dopant; and
    a second region doped with a second dopant and a third dopant;
    one of said first and second regions being surrounded by the other;
    said first region having a first glass composition for cooperating with said first dopant to provide a first gain characteristic;
    said second region having a second glass composition for cooperating with said second dopant to provide a second gain characteristic different from the first gain characteristic;
    said third dopant being selected so that, when said third dopant is pumped, said second dopant is pumped by said third dopant pumped.

14. An optical fiber according to claim 13, wherein said first and second dopants are a same dopant.

15. An optical fiber according to claim 13, wherein each of said first, second and third dopants includes a rare earth element.

16. An optical fiber according to claim 13, wherein said first and second regions are included in a core having a comparatively high refractive index, said optical fiber further comprising a cladding which surrounds said core and has a comparatively low refractive index.

17. An optical fiber according to claim 13, wherein said second region is surrounded by said first region.

18. An optical fiber according to claim 13, wherein each of said first and second dopants includes Er (erbium) and said third dopant includes Yb (ytterbium).

19. An optical fiber according to claim 13, wherein one of said first and second glass compositions includes Al (aluminum), P (phosphor) and Si (silicon) and the other includes Al and Si.

20. An optical amplifier, comprising:
    an optical waveguide structure including a first region having a first glass composition doped with a first dopant and a second region having a second glass composition doped with a second dopant and a third dopant, said second region being positioned in the vicinity of said first region in said optical waveguide structure;
    a first pump source for pumping said first dopant so that said optical waveguide structure provides a first gain characteristic determined by said first glass composition and said first dopant; and
    a second pump source for pumping said third dopant so that said optical waveguide structure provides a second gain characteristic determined by said second glass composition and said second dopant, said second gain characteristic being different from said first gain characteristic;
    said second dopant being pumped by energy transfer from said third dopant pumped by said second pump source.

21. An optical fiber for use with an optical amplifier, comprising:

a first region doped with a first dopant; and a second region doped with a second dopant and a third dopant, said second region being positioned in the vicinity of said first region in said optical fiber;

said first region having a first glass composition for cooperating with said first dopant to provide a first gain characteristic;

said second region having a second glass composition for cooperating with said second dopant to provide a second gain characteristic different from the first gain characteristic;

said third dopant being selected so that, when said third dopant is pumped, said second dopant is pumped by said third dopant pumped.

* * * * *